(12) United States Patent
Kushiya

(10) Patent No.: US 10,838,632 B2
(45) Date of Patent: Nov. 17, 2020

(54) MEMORY SYSTEM LOCKING OR UNLOCKING DATA READ TO NONVOLATILE MEMORY AND CONTROL METHOD THEREOF

(71) Applicant: TOSHIBA MEMORY CORPORATION, Minato-ku (JP)

(72) Inventor: Kazuhiro Kushiya, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 16/353,251

(22) Filed: Mar. 14, 2019

(65) Prior Publication Data

US 2020/0125279 A1  Apr. 23, 2020

(30) Foreign Application Priority Data

Oct. 23, 2018 (JP) ................................. 2018-199212

(51) Int. Cl.
| | | |
|---|---|---|
| *G06F 3/06* | (2006.01) | |
| *G06F 21/62* | (2013.01) | |
| *H04B 5/00* | (2006.01) | |

(52) U.S. Cl.
CPC .......... *G06F 3/0622* (2013.01); *G06F 3/0655* (2013.01); *G06F 3/0679* (2013.01); *G06F 21/6218* (2013.01); *H04B 5/0056* (2013.01)

(58) Field of Classification Search
CPC ....................................................... G06F 3/06
USPC ....................................................... 711/163
See application file for complete search history.

(56) References Cited

U.S. PATENT DOCUMENTS

| | | | | |
|---|---|---|---|---|
| 6,513,095 | B1 * | 1/2003 | Tomori ................ | G11C 16/102 711/103 |
| 7,418,602 | B2 * | 8/2008 | Yoshida .................. | G06F 21/31 713/193 |
| 9,813,096 | B2 | 11/2017 | Ido et al. | |
| 9,888,451 | B2 | 2/2018 | Ido et al. | |
| 2003/0146462 | A1 * | 8/2003 | Iwata ..................... | G06F 1/3203 257/300 |
| 2004/0049645 | A1 * | 3/2004 | Lee ...................... | G06F 12/1441 711/163 |

(Continued)

FOREIGN PATENT DOCUMENTS

| | | |
|---|---|---|
| JP | 2015-195488 | 11/2015 |
| JP | 2017-68823 | 4/2017 |

(Continued)

*Primary Examiner* — Christopher B Shin
(74) *Attorney, Agent, or Firm* — Oblon, McClelland, Maier & Neustadt, L.L.P.

(57) ABSTRACT

According to one embodiment, a memory system includes a nonvolatile memory and a controller. When power supply is started with respect to the controller, the controller reads file allocation data indicative of an allocation position of a file stored in the nonvolatile memory from the nonvolatile memory, generates information indicating that the controller is permitted to read a system file stored in the nonvolatile memory, and generates information indicating that the controller is not permitted to read a first user file already written in the nonvolatile memory before the power supply, and generates information indicating that the controller is permitted to read a second user file written in the nonvolatile memory after the start of the power supply.

13 Claims, 6 Drawing Sheets

(56) References Cited

U.S. PATENT DOCUMENTS

| | | | |
|---|---|---|---|
| 2006/0164886 A1* | 7/2006 | Tanaka | G11C 16/22 365/185.11 |
| 2007/0079043 A1* | 4/2007 | Yu | G06F 13/28 710/305 |
| 2007/0222610 A1* | 9/2007 | Tagato | G06K 19/07336 340/572.7 |
| 2011/0066920 A1* | 3/2011 | Yu | G06F 11/1064 714/758 |
| 2017/0091123 A1* | 3/2017 | Sato | G06F 21/44 |
| 2017/0118530 A1 | 4/2017 | Amano et al. | |
| 2018/0275900 A1 | 9/2018 | Teranishi et al. | |
| 2019/0065086 A1* | 2/2019 | Margetts | G06F 3/0659 |
| 2019/0074283 A1* | 3/2019 | Amaki | G11C 7/04 |
| 2019/0221273 A1* | 7/2019 | Parkinson | G06F 3/0679 |
| 2020/0075114 A1* | 3/2020 | Lin | G11C 29/12 |

FOREIGN PATENT DOCUMENTS

| | | |
|---|---|---|
| JP | 2017-72887 | 4/2017 |
| JP | 2017-143393 | 8/2017 |
| JP | 2018-163489 | 10/2018 |

\* cited by examiner

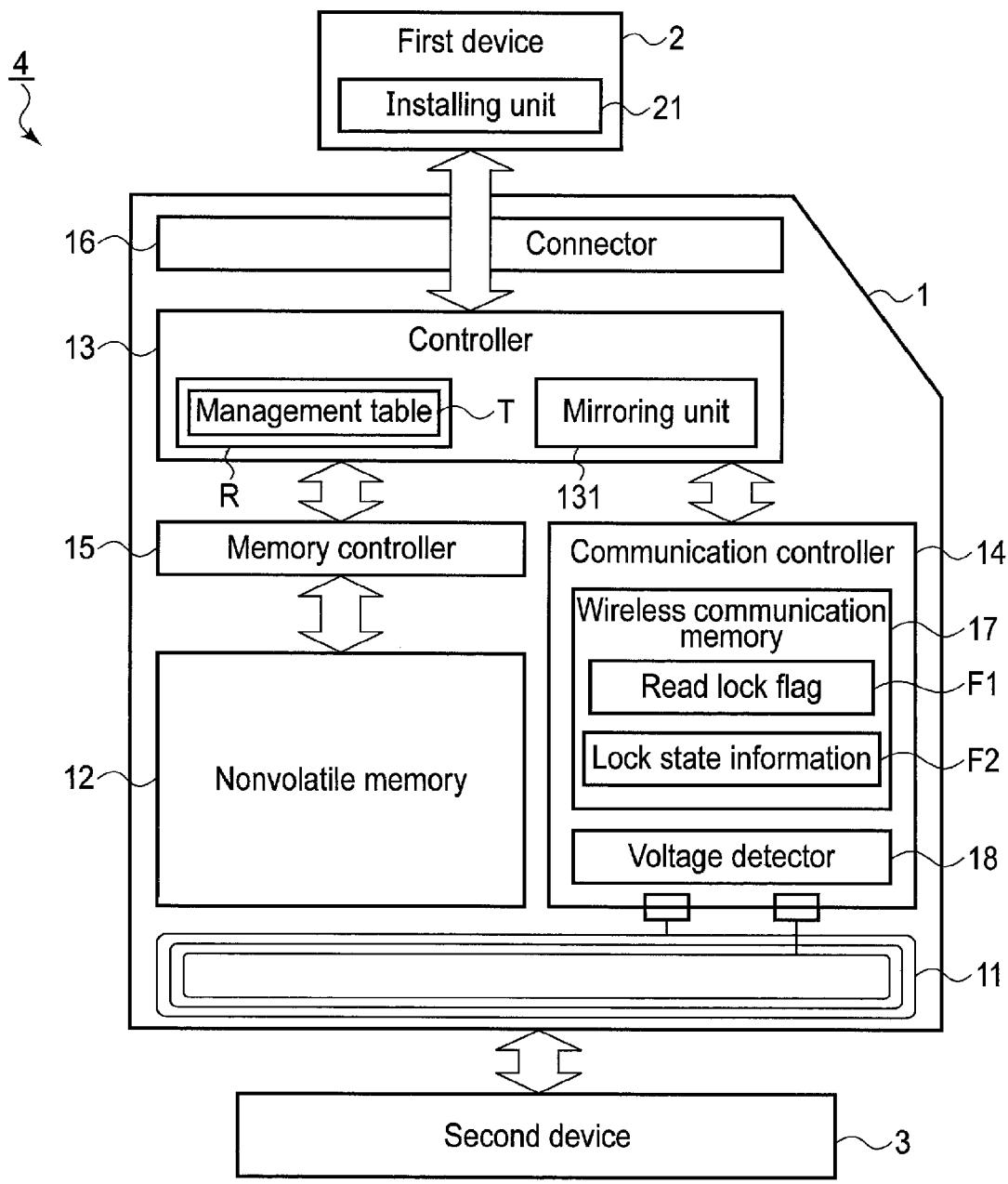
F I G. 1

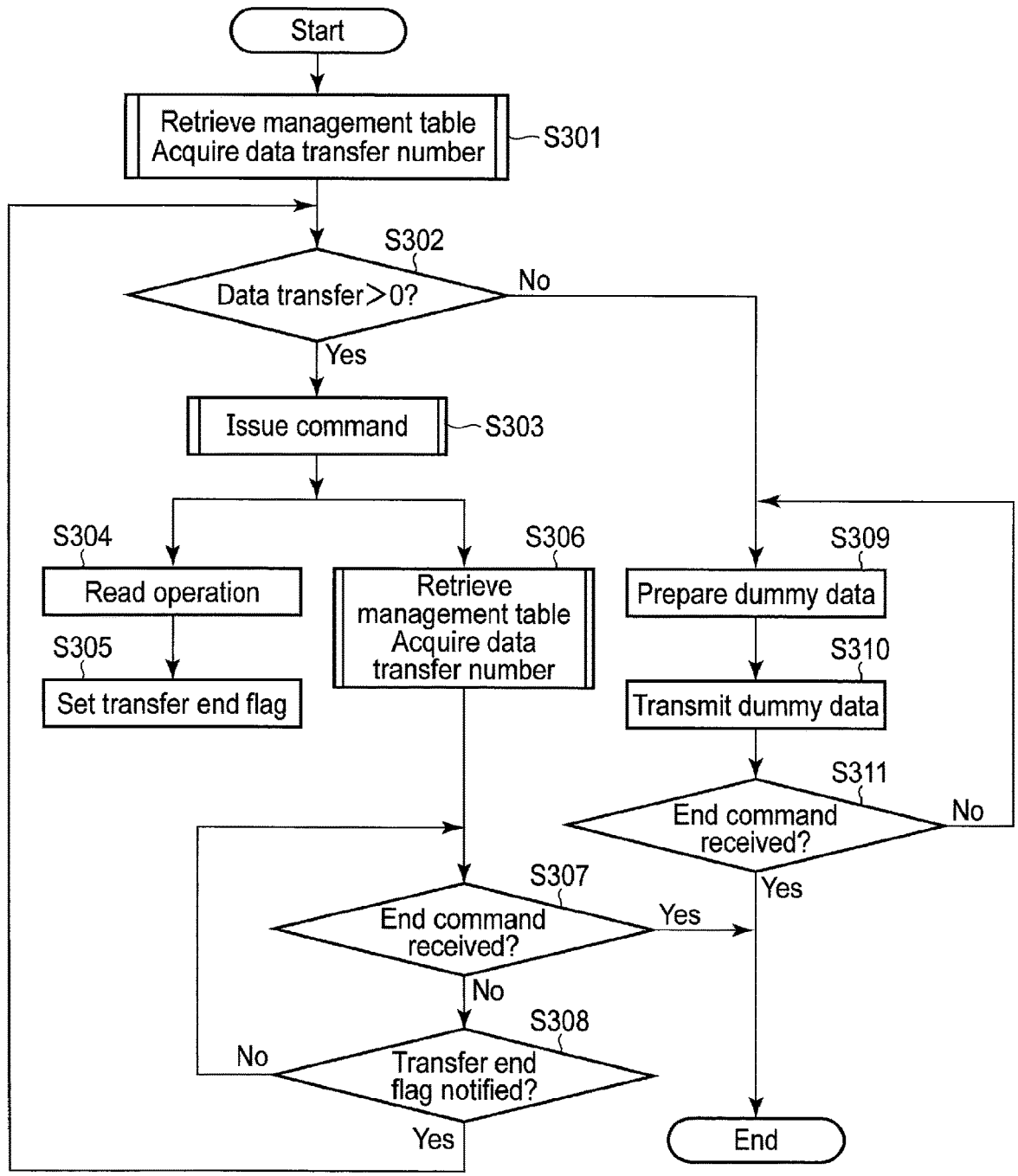
F I G. 3

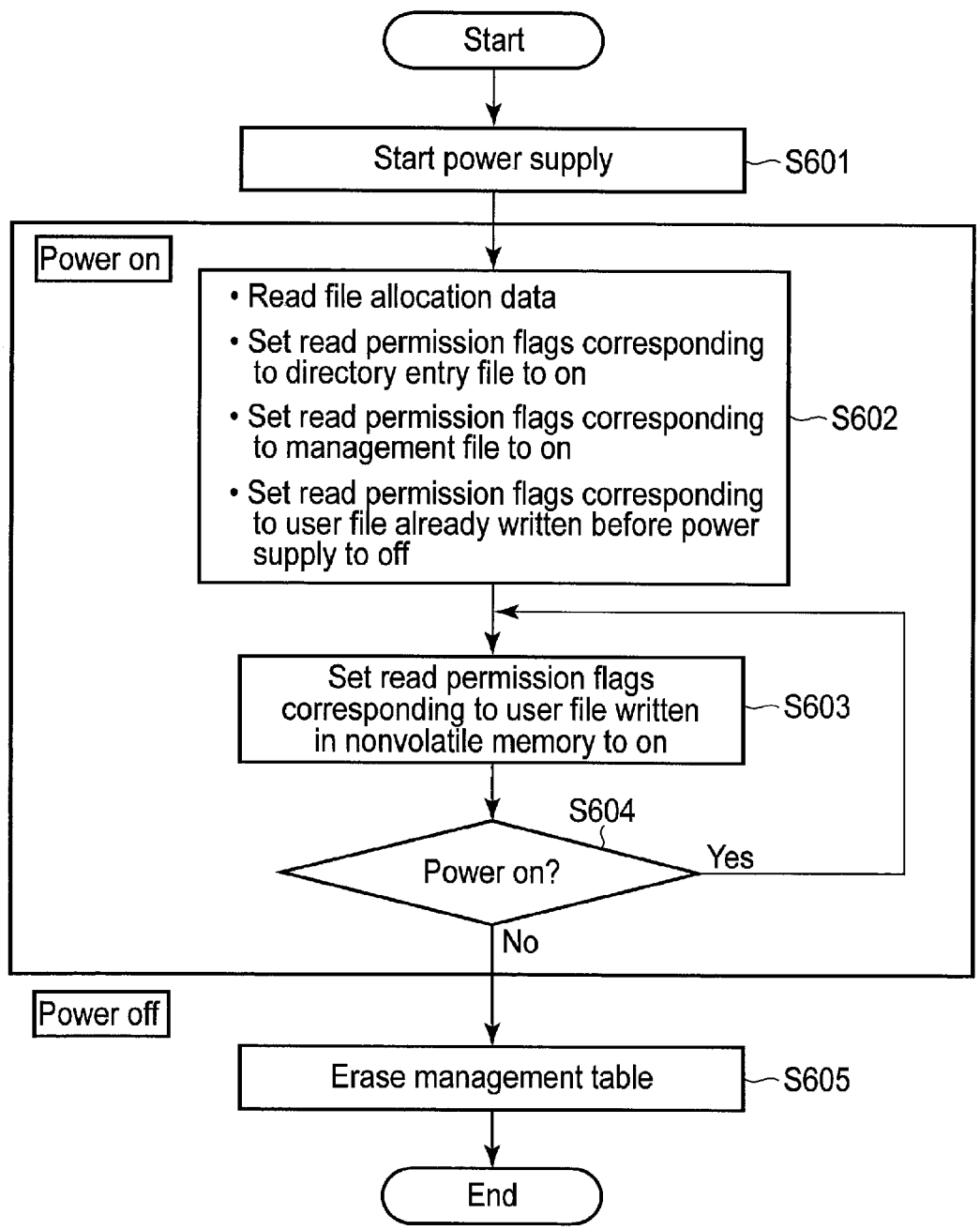
F I G. 6

MEMORY SYSTEM LOCKING OR UNLOCKING DATA READ TO NONVOLATILE MEMORY AND CONTROL METHOD THEREOF

CROSS-REFERENCE TO RELATED APPLICATIONS

This application is based upon and claims the benefit of priority from Japanese Patent Application No. 2018-199212, filed Oct. 23, 2018, the entire contents of which are incorporated herein by reference.

FIELD

Embodiments described herein relate generally to a memory system and a control method thereof.

BACKGROUND

Memory systems detachably attached to an electronic device and including a nonvolatile memory are widely used. When such a memory system is attached to an electronic device, the electronic device can write data to the memory system, or can read data from the memory system. The memory system detachably attached to an electronic device is, for example, a memory card.

BRIEF DESCRIPTION OF THE DRAWINGS

FIG. 1 is a block diagram showing an example of the structure of a memory system of an embodiment.

FIG. 3 is a flowchart showing an example of a data read process in a read lock mode of the embodiment.

FIG. 6 is a flowchart of an example of a setting process of read permission flags of the memory system of the embodiment.

DETAILED DESCRIPTION

Figure 2:
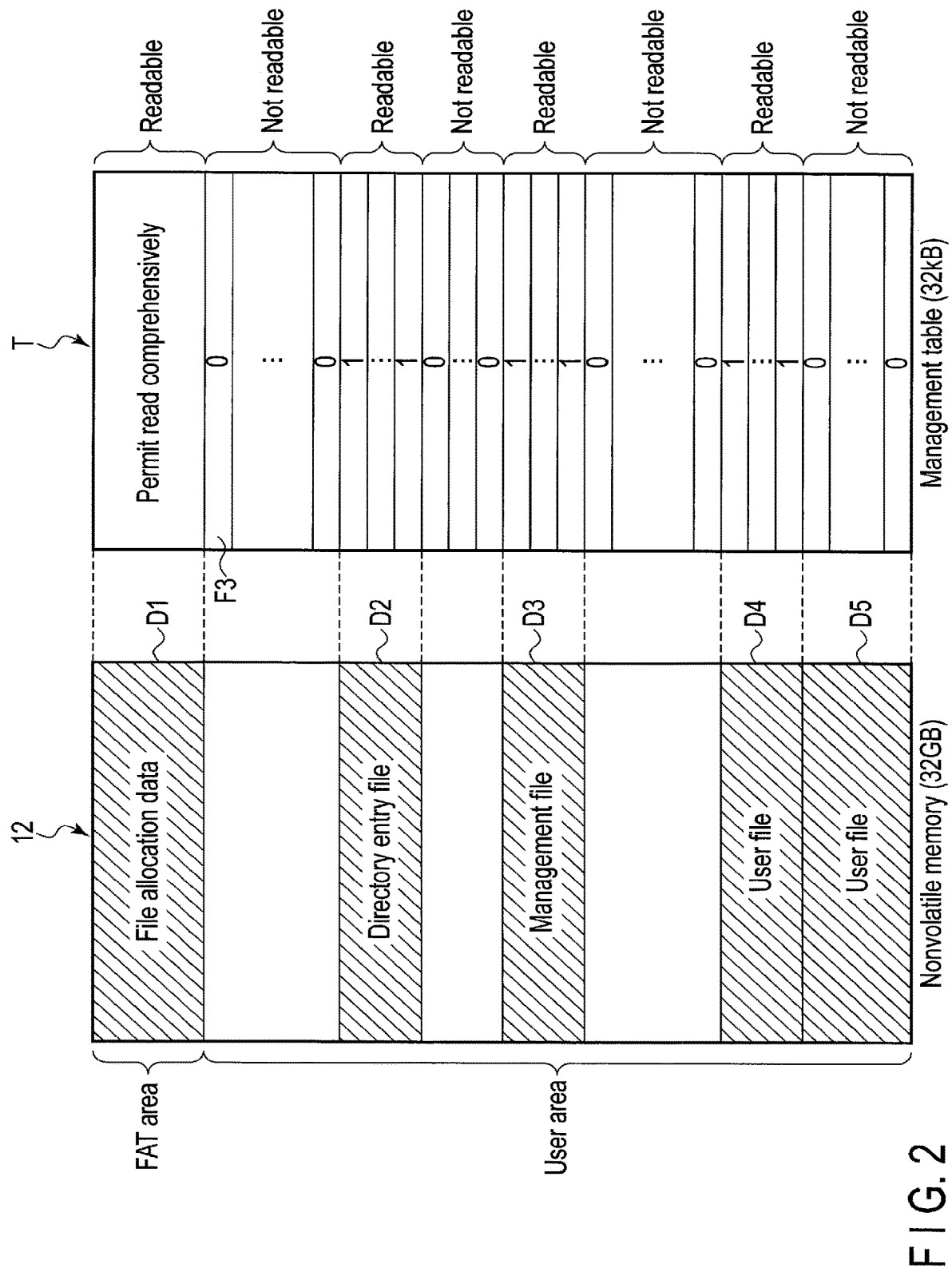
FIG. 2 is a view showing an example of a relationship between a management table and a nonvolatile memory of the embodiment.

Embodiments will be described hereinafter with reference to the accompanying drawings. In the following description, constituent elements having substantially the same function and configuration will be denoted by the same reference number, and description will be repeated only when necessary. Further, the following embodiments illustrate a device and a method which give concrete forms to technical ideas, and the technical ideas of the embodiments are not intended to limit materials, shapes, structures, arrangements, etc., of components to those descried below. The technical ideas of the embodiments can be modified in various manners in the scope of patent claims.

In general, according to one embodiment, a memory system includes a nonvolatile memory and a controller. The controller controls access to the nonvolatile memory. When power supply is started with respect to the controller, the controller reads file allocation data indicative of an allocation position of a file stored in the nonvolatile memory from the nonvolatile memory, generates information indicating that the controller is permitted to read a system file stored in the nonvolatile memory, generates information indicating that the controller is not permitted to read a first user file already written in the nonvolatile memory before the power supply, and generates information indicating that the controller is permitted to read a second user file written in the nonvolatile memory after the start of the power supply.

In the present embodiment, data read with respect to a nonvolatile memory is locked or unlocked to secure data security.

In the present embodiment, access represents one or both of write and read of data with respect to the storage device.

In the present embodiment, a flag-on means writing a state where a flag is effective (for example, "1") and a flag-off means writing a state where a flag is ineffective (for example, "0").

FIG. 1 is a block diagram showing an example of the structure of a memory system 1 of the present embodiment.

The memory system 1 is electrically connected to a first device 2 and can perform wireless communication with a second device 3.

An information processing system 4 includes, for example, the memory system 1, first device 2, and second device 3.

The first device 2 may be a first host device of the memory system 1. The first device 2 includes an installing unit 21 by which the memory system 1 is detachably attachable. The first device 2 can transfer/receive a command, address, data, information, instruction, signal, and the like to/from the memory system 1 while the memory system 1 is attached to the installing unit 21. The first device 2 may be, for example, a digital camera, toy, smartwatch, gaming device, mobile phone, information processing device, computer, wearable terminal, controller, or electronic device.

The second device 3 may be a second host device of the memory system 1. The second device 3 may be, for example, a mobile phone (including smartphone), computer, gaming device, wearable terminal, portable device, controller, or electronic device. The second device 3 can transfer/receive a command, address, data, information, instruction, signal, and the like to/from the memory system 1 via wireless communication.

The memory system 1 can perform wireless communication with an external device such as second device 3. A user brings the memory system 1 close to, contacting with, or adhered to the second device 3. Thus, wireless communication is established between the memory system 1 and the second device 3.

The memory system 1 performs verification of the second device 3 when starting wireless communication with the second device 3. The memory system 1 approves read/write of data from/to the second device 3 via wireless communication when the verification succeeds. Or, the memory system 1 denies read/write of data from/to the second device 3 via wireless communication when the verification fails.

The memory system 1 may be one of various memory devices, for example, a memory card (SD memory card or multimedia card, for example), universal serial bus (USB) memory, hard disk drive (HDD), and solid state disk (SSD). In the present embodiment, the memory system 1 is a memory card.

In the present embodiment, the memory system 1 uses wireless communication interface conforming to near field communication (NFC) which is a near field wireless communication standard using frequency of 13.56 MHz. However, the wireless communication interface used by the memory system 1 may be wireless communication interface such as wireless local area network (LAN). The NFC can perform communication with lower power as compared to conventional wireless LAN.

When the memory system 1 is attached to the first device 2, the memory system 1 is electrically connected to the first device 2, and power from the first device 2 is supplied thereto. In the present embodiment, a state where the power is supplied from the first device 2 to the memory system 1 will be referred to as a power on state of the memory system 1. The memory system 1 can transfer data to the first device 2 and can receive data from the first device 2.

In the present embodiment, the memory system 1 transmits/receives data to/from the first device 2 based on a wired interface such as SD interface. However, the memory system 1 may transmit/receive data to/from the first device 2 using a different interface.

The memory system 1 includes a function to communication with an external device such as second device 3 using power produced (induced) by electromagnetic induction of the wireless antenna 11 even if no power is supplied from the first device 2. That is, the memory system 1 can transmit/receive data to/from the second device 3 performing, for example, wireless communication. The memory system 1 can be operated by at least partially element using the power produced by electromagnetic induction based on the radio wave from the second device 3 even without the power supply from the first device 2.

The memory system 1 includes a wireless antenna 11, nonvolatile memory 12, controller 13, communication controller 14, memory controller 15, and connector 16. The controller 13 includes a mirroring unit 131 and a memory R. The memory R stores a management table T. At least one of the mirroring unit 131 and the memory R may be included in the outside of the controller 13. The communication controller 14 includes a wireless communication memory 17 and a voltage detector 18. The wireless communication memory 17 stores a read lock flag F1 and lock state information F2.

The communication controller 14 and the wireless communication memory 17 may be structured separately. The controller 13, communication controller 14, and memory controller 15 may be combined freely or may be separated. For example, the memory controller 15 may be included in the controller 13. The memory controller 15 and the controller 13 may be one-chipped.

In the present embodiment, the controller 13, communication controller 14, and memory controller 15 may be structured with an electronic circuit. Specifically, the controller 13, communication controller 14, or memory controller 15 may be, for example, an application specific integrated circuit (ASIC). The controller 13, communication controller 14, or memory controller 15 is, for example, a processor and various controls which will be described later may be achieved by executing a program.

The controller 13, memory controller 15, and nonvolatile memory 12 function while the memory system 1 receives the power supply from the first device 2. When the memory system 1 receives the power only via the wireless antenna 11 and does not receive power from the first device 2, the controller 13, memory controller 15, and nonvolatile memory 12 may not operate. On the other hand, the communication controller 14 can operate even when the memory system 1 receives power via the wireless antenna 11 and does not receive power from the first device 2. That is, when the wireless antenna 11 receives wireless radio wave of certain frequency corresponding to the NFC, the communication controller 14 becomes operable, and the memory system 1 can perform communication by NFC.

The controller 13 receives a command, address, data, information, instruction, signal, and the like from the first device 2 via the connector 16. Furthermore, the controller 13 receives a command, address, data, information, instruction, signal, and the like from the second device 3 via the wireless antenna 11 and the communication controller 14. The controller 13 is a bridge controller which controls the data transmission/reception between the first device 2 and the memory controller 15 and between the second device 3 and the memory controller 15.

Furthermore, the controller 13 controls the data transfer from the memory controller 15 to the communication controller 14 and the data transfer from the communication controller 14 to the memory controller 15.

The controller 13 transmits, based on a command received, a command, address, data, information, instruction, signal, and the like to the memory controller 15, or the communication controller 14, or the first device 2 via the connector 16.

The controller 13 controls access and mirroring with respect to the nonvolatile memory 12.

The management table T includes information indicative of whether or not the data stored in the nonvolatile memory 12 is permitted to be read per data unit of certain size. The controller 13 generates information indicative of whether or not the data is permitted to be read. Then, the controller 13 uses the management table T stored in the memory R to determine whether or not the data stored in the nonvolatile memory 12 are permitted to be read per certain data unit. The management table T will be described layer with reference to FIG. 2.

The mirroring unit 131 of the controller 13 performs mirroring (synchronization) between the data stored in the nonvolatile memory 12 and the data stored in the wireless communication memory 17. Here, the mirroring means sharing the same data between two or more memories. The mirroring unit 131 may perform mirroring when the memory system 1 receives the power supply from the first device 2, or may perform mirroring when write or update occurs with respect to at least one of the data of the nonvolatile memory 12 and the wireless communication memory 17.

The mirroring unit 131 reads, in the execution timing of the mirroring, the read lock flag F1 and the lock state information F2 from the wireless communication memory 17 via the communication controller 14.

The mirroring unit 131 does not read the data from the nonvolatile memory 12 if the memory system 1 is in a lock/unlock mode and the lock state information F2 indicate not-readable.

The mirroring unit 131 does not write the data stored in the wireless communication memory 17 in the nonvolatile memory 12 if the lock state information F2 indicate not-writable.

The mirroring unit 131 can write the data stored in the wireless communication memory 17 in the nonvolatile memory 12 if the lock state information F2 indicate writable.

The mirroring unit 131 determines whether or not a read lock mode is on the basis of the read lock flag F1. If the read lock mode is on, the mirroring unit 131 refers to the management table T and determines whether or not read of data as a target of read command is permitted. If read of data is permitted, the mirroring unit 131 reads the data from the nonvolatile memory 12 via the memory controller 15, and stores the read data in the wireless communication memory 17 via the communication controller 14. If read of data is not permitted, the mirroring unit 131 stores dummy data generated by the controller 13, dummy data read by the controller 13 from the nonvolatile memory 12 via the memory controller 15, or response indicating that the data are not-readable in the wireless communication memory 17 via the communication controller 14.

The memory controller 15 controls the nonvolatile memory 12. The memory controller 15 writes data in the nonvolatile memory 12 based on a write command input from the controller 13, for example. Furthermore, the memory controller 15 reads data from the nonvolatile memory 12 and transmits the data to the controller 13 based on a read command input from the controller 13, for example.

In the present embodiment, the controller 13 or the memory controller 15 may be accessible to the wireless communication memory 17 via the communication controller 14 or without passing through the communication controller 14.

The nonvolatile memory 12 may be, for example, a nonvolatile semiconductor memory. The nonvolatile memory 12 is, for example, a NAND flash memory, or may be a different nonvolatile semiconductor memory such as magnetoresistive random access memory (MRAM), phasechange random access memory (PRAM), resistive random access memory (ReRAM), or ferroelectric random access memory (FeRAM). For example, the nonvolatile memory 12 may be a magnetic memory. The nonvolatile memory 12 is, for example, a three-dimensional structure memory.

The wireless antenna 11 is, for example, a PCB pattern antenna. The frequency band in which the wireless antenna 11 can operate may be a certain frequency band corresponding to NFC.

The wireless antenna 11 can produce power by electromagnetic induction based on the radio wave from the second device 3, for example. The wireless antenna 11 supplies the produced power to the communication controller 14.

The wireless antenna 11 receives a command, address, data, information, instruction, signal, and the like from the second device 3. The wireless antenna 11 transmits the received command and the like to the communication controller 14.

The communication controller 14 performs communication with the second device 3 or the like via the wireless antenna 11. The communication controller 14 receives a command, address, data, information, instruction, signal, and the like from the controller 13 or the wireless antenna 11. The communication controller 14 transmits data and the like to the controller 13 or the wireless antenna 11 based on the received command and the like, for example. Furthermore, the communication controller 14 reads data from the wireless communication memory 17 based on the received command and address, and transmits the read data to the controller 13 or the wireless antenna 11. Furthermore, the communication controller 14 stores data in the wireless communication memory 17 based on the received command, address, and data.

The communication controller 14 writes, when a command and data are received from the controller 13 or the wireless antenna 11, the data in the wireless communication memory 17. However, the communication controller 14 may not perform write of data to the wireless communication memory 17.

In the present embodiment, a command, address, data, information, instruction, signal, and the like communicated between the first device 2, controller 13, memory controller 15, communication controller 14, and wireless antenna 11, for example, may not have the matched format. That is, a command, address, data, information, instruction, signal, and the like may have a format which can be recognized between a transmitter and a receiver, and the format is not necessarily recognizable between the transmitter and a part other than the receiver.

The wireless communication memory 17 is, for example, a nonvolatile memory. The wireless communication memory 17 stores the data based on the control by the communication controller 14. Note that the wireless communication memory 17 may be volatile, and the data storage in the wireless communication memory 17 may be temporarily. The wireless communication memory 17 may be, for example, electrically erasable programmable read-only memory (EEPROM). However, the wireless communication memory 17 may be one of various memories as in the above-mentioned nonvolatile memory 12.

Note that, in order to operate with the power supplied from the wireless antenna 11, the wireless communication memory 17 is, preferably, operable with power consumption per capacity which is less than that of the nonvolatile memory 12. Specifically, a NOR memory may be used as the wireless communication memory 17.

The voltage detector 18 is electrically connected to the wireless antenna 11. The voltage detector 18 detects voltage supplied from the wireless antenna 11 to the communication controller 14. Then, the voltage detector 18 issues a reset command of NFC communication until the voltage reaches certain voltage where the communication controller 14 is operable. While receiving the reset command, the communication controller 14 does not perform the NFC communication. With the reset command issued, abnormal activation and operation of the communication by NFC can be prevented. The voltage detector 18 may transmit an operable command to the communication controller 14 if the voltage reaches the certain voltage. The communication controller 14 performs the communication control of NFC only when the operable command is received.

The connector 16 is, for example, a standardized connection terminal, and enables electrical connection between the memory system 1 and the first device 2.

The memory system 1 of the present embodiment operates in a lock/unlock mode or a read lock mode. Specifically, the controller 13 reads the read lock flag F1 and the lock state information F2 stored in the wireless communication memory 17 via the communication controller 14, and performs control in accordance with the contents of the read lock flag F1 and the lock state information F2.

In the present embodiment, lock (in other words, access limitation) means not allowing the memory system 1 to read data from the nonvolatile memory 12 or write data to the nonvolatile memory 12, and unlock (in other words, access permission) means making a state where write to the nonvolatile memory 12 is not allowed to a state where write is allowed or making a state where read from the nonvolatile memory 12 is not allowed to a state where read is allowed.

The lock/unlock mode is a mode where, if a user wants to lock or unlock access to the nonvolatile memory 12, accessing of the memory controller 15 to the nonvolatile memory 12 is locked or unlocked using the wireless communication from the second device 3 to the communication controller 14. If the lock/unlock mode indicates a lock state, the memory system 1 ignores all read commands/write commands from the first device 2 and the second device 3, for example. In the lock/unlock mode of the present embodiment, locking or unlocking means that, for example, the controller 13 transmits a lock/unlock command to the memory controller 15 and the memory controller 15 locks or unlocks access to the nonvolatile memory 12 based on the lock/unlock command.

The read lock mode is a mode where data written in the nonvolatile memory 12 become readable while power is continuously supplied from the first device 2 to the memory system 1, and, when the power supply is stopped for a while and then is started again, data written in the nonvolatile memory 12 before the stop of the power supply become unreadable.

The control of the controller 13 based on the read lock mode will be explained.

When the power supply from the first device 2 to the memory system 1 is started (for example, in a power up state), the controller 13 of the present embodiment generates a management table T, reads the read lock flag F1 and the lock state information F2 from the wireless communication memory 17 via the communication controller 14, and stores the read lock flag F1 and the lock state information F2 read therefrom in the memory R. The management table T includes, for example, a read permission flag indicating whether or not read is permitted per data of certain size (for example, first size) of the nonvolatile memory 12, for example.

The controller 13 reads the read lock flag F1 of the memory R if a read command is received from the first device 2 via the connector 16. The controller 13 determines whether or not the read lock mode is on based on the read lock flag F1. If the read lock mode is on, the controller 13 refers to the management table T and determines whether or not read of the data as a read target is permitted.

If read of the data as a read target is permitted, the controller 13 sequentially reads data of read size smaller than a certain size managed to be determined whether or not read is permitted (for example, second size) from the nonvolatile memory 12 via the memory controller 15, and sequentially transmits the read data of read size to the first device 2 via the connector 16.

Furthermore, in the present embodiment, the controller 13 may repeat the retrieval of the read permission flag corresponding to the read command, for example. In that case, the controller 13 determines whether or not read is permitted by the read permission flags obtained by the repeated retrieval and whether or not a sum of the retrieved read sizes corresponding to the read permission flags becomes equal to or more than a threshold value. Then, the controller 13 sequentially reads data of read size of which read is permitted from the nonvolatile memory 12 if the sum of the read sizes becomes equal to or more than the threshold value and sequentially transmits the read data of read size to the first device 2 via the connector 16. The controller 13 repeats the retrieval of the read permission flag corresponding to the read command if the sum of the read sizes is less than the threshold value.

If read of data as a read target is not permitted, the controller 13 transmits dummy data generated by the controller 13, dummy data read by the controller 13 from the nonvolatile memory 12 via the memory controller 15, or response indicating that the data are not readable, to the first device 2 via the connector 16. The controller 13 may generate random data as dummy data, or may automatically generate data which do not require a secret state, for example.

In the read lock mode, for example, even if read of data written in the nonvolatile memory 12 before the stop of the power supply is locked, the controller 13 may be able to write data corresponding to the write command in the nonvolatile memory 12 via the memory controller 15.

If the read lock mode is unlocked, the controller 13 may permit read of data written in the nonvolatile memory 12 before the stop of the power supply via the memory controller 15.

When a write command is received from the first device 2 via the connector 16, the controller 13 sets read permission flags corresponding to a user file of a write target based on an address and a data size included in the write command.

The read lock flag F1 is a flag indicating whether or not the memory system 1 is in a read lock mode. The memory system 1 is in the read lock mode, the read lock flag F1 becomes on, and if the memory system 1 is not in the read lock mode, the read lock flag F1 becomes off.

The lock state information F2 manage whether or not write or read of data with respect to the nonvolatile memory 12 is denied. The controller 13 reads, when a write command or a read command of data is received from the first device 2 via the connector 16, the lock state information F2 of the memory R or the lock state information F2 of the wireless communication memory 17 via the communication controller 14, and determines whether or not write or read of the data is permitted based on the lock state information F2.

The lock state information F2 include data indicative of, for example, permission or denial of read, permission or denial of write, or permission or denial of both read and write with respect to the nonvolatile memory 12. The lock state information F2 include, for example, a plurality of bits and switch on/off of each bit to achieve four types of lock states of read/write permitted, read only permitted, write only permitted, and read/write denied in the nonvolatile memory 12. Note that the states of the lock state information F2 are not limited to the above-mentioned examples.

The communication controller 14 receives an instruction from the second device 3 using the wireless communication between the memory system 1 and the second device 3, and can change the read lock flag F1 and the lock state information F2 based on the instruction. Furthermore, the communication controller 14 receives an instruction from the first device 2 via the connector 16 and the controller 13 while the memory system 1 is attached to the installing unit 21 of the first device 2, and can change the read lock flag F1 and he lock state information F2 based on the instruction.

Note that, in the present embodiment, the read lock flag F1 and the lock state information F2 are, preferably, stored in a secret area of the wireless communication memory 17. However, the read lock flag F1 and the lock state information F2 may be stored in a public area of the wireless communication memory 17.

FIG. 2 shows an example of a relationship between the management table T and the nonvolatile memory 12 of the present embodiment.

The management table T includes a read permission flag F3 indicative of whether or not read from the nonvolatile memory 12 with respect to data of certain unit (size) of the nonvolatile memory 12 is permitted. If the read permission flag F3 corresponding to the data stored in the nonvolatile memory 12 is on, the controller 13 can read the data using the memory controller 15. Furthermore, if the read permission flag F3 corresponding to the data is off, the controller 13 cannot read the data using the memory controller 15.

In the following description, a certain unit is 128 kilobytes. In that case, if the nonvolatile memory 12 is 32 gigabytes as shown in FIG. 2, the management table T is 32 kilobytes, for example. Note that the certain unit can be optionally changed based on the types of the nonvolatile memory 12 and the types, characteristics, sizes of data stored in the nonvolatile memory 12.

As described above, each read permission flag F3 is associated with the data of certain size stored in the nonvolatile memory 12. An initial value of the read permission flag F3 may be preliminarily determined by the controller 13, for example, in accordance with the types of data of certain size associated with the read permission flag F3. In that case, the controller 13 determines the type of data of certain size stored in the nonvolatile memory 12 and generates a management table T including a relationship between the identification information of the data and the initial value corresponding to the type of the data, and stores the management table T in the memory R.

The nonvolatile memory 12 includes file allocation data D1. The file allocation data D1 include information in which a file ID and a position of a file (or data) stored in the nonvolatile memory 12. The controller 13 refers to the file allocation data D1 via the memory controller 15 in the time to start the power supply, and thereby, can recognize which file is positioned in what part of the nonvolatile memory 12.

The file allocation data D1 may be arranged in a file allocation table (FAT) area of the nonvolatile memory 12, for example. The file allocation data D1 may be stored in the top of the nonvolatile memory 12, for example.

The file allocation data D1 of the nonvolatile memory 12 are set, managed, and controlled by the first device 2, specifically, by a file system of the first device 2.

In the present embodiment, an address range in which the file allocation data D1 are positioned is comprehensively set to readable, and the controller 13 can read the file allocation data D1 using the memory controller 15. Thus, in the present embodiment, the read permission flags F3 related to the file allocation data D1 are not necessarily managed in the management table T. The controller 13 recognizes that the address range corresponding to the file allocation data D1 are accessible.

The nonvolatile memory 12 stores, for example, directory entry file D2, management file D3, and user files D4 and D5 in a user area.

The directory entry file D2 includes data used to determine an entry of the management table T from a physical address of the nonvolatile memory 12. In other words, the directory entry file D2 associates a physical address of the nonvolatile memory 12 with an entry of the management table T (for example, read permission flag F3).

The management file D3 is, for example, a system file used by the first device 2 to manage the memory system 1. For example, if the memory system 1 is attachable to a plurality of devices and an individual management file D3 is required to each of the devices, a plurality of management files D3 corresponding to the devices may be stored in the nonvolatile memory 12. In that case, the controller 13 may be able to determine which management file D3 is associated with which device from a filename extension corresponded to each of the management files D3.

The controller 13 may set initial values of the read permission flags F3 corresponding to the management file D3 to on before the first device 2 performs reading/writing data from/to the memory system 1. Thus, read with respect to the management file D3 is initially permitted.

The user files D4 and D5 are, for example, files of documents, movies, and images (for example, user data) written based on an instruction from the first device 2 or the second device 3.

In the present embodiment, the user file D4 is the data written in the nonvolatile memory 12 while the power supply is continued from the first device 2 to the controller 13.

The user file D5 is the data already written in the nonvolatile memory 12 before the power supply from the first device 2 to the controller 13 is started.

In the read lock mode, for example, when the controller 13 to which power is supplied from the first device 2 writes the user file D4 to the nonvolatile memory 12 via the memory controller 15, the controller 13 sets, while the power supply from the first device 2 is continued, the read permission flags F3 corresponding to the user file D4 on to make the user file D4 readable. Thus, during a period when the user file D4 is written in the memory system 1 until the power supply from the first device 2 to the memory system 1 is stopped, the first device 2 can read the written user file D4 from the memory system 1 for the display. Thus, a user can recognize whether or not the written data are properly stored in the memory system 1 using the first device 2. Then, the power supply from the first device 2 to the memory system 1 is stopped, and then, the power supply from the first device 2 to the memory system 1 is started again, the controller 13 sets the read permission flags F3 corresponding to the user file D4 off, and makes the user file D4 non-readable until the read lock mode is unlocked.

Note that, in the read lock mode, permission and denial of read may be switched by a different condition instead of switching permission and denial of read based on the stop and restart of the power supply from the first device 2 to the memory system 1.

For example, the controller 13 may permit read of user file D4 for a certain period of time from writing of the user file D4 to the nonvolatile memory 12, and update the management table T such that the read of user file D4 is denied after the certain period of time. In that case, a user can easily recognize the content of user file D4 for the certain period of time after the writing of the user file D4. Thus, security of written data is secured, and convenience of user can be improved.

For example, in the read lock mode, the controller 13 sets the initial values of the read permission flags F3 of the user file D5 already written in the nonvolatile memory 12 before the start of the power supply from the first device 2 to the controller 13 to off. In that case, the controller 13 cannot read the user file D5. Thus, security of the user file D5 can be secured.

Note that the controller 13 may identify the type of the first device 2 and determine the type of data to be readable based on the type of the first device 2. In that case, the controller 13 sets the read permission flag F3 corresponding to the data determined to be readable to on.

In the following description, generation and use of the management table T will be explained specifically.

When, for example, power is supplied from the first device 2 to the memory system 1 and the memory system 1 is turned on, the controller 13 reads the read lock flag F1 from the wireless communication memory 17 via the communication controller 14 and stores the read lock flag F1 in the memory R. Furthermore, the controller 13 generates, if the read lock flag F1 indicates setting the read lock mode to on, a management table T and stores the generated management table T in the memory R.

An area in which the file allocation data D1 are stored is determined by, for example, a file system used by an external device such as first device 2. Thus, the controller 13 of the present embodiment determines that a certain address range in which the file allocation data D1 are positioned is comprehensively readable without referring to the management table T.

As to the directory entry file D2 and the management file D3, when the power supply from the first device 2 to the controller 13 is started, for example, the controller 13 retrieves the nonvolatile memory 12 via the memory controller 15, sets the read permission flags F3 corresponding to the directory entry file D2 in on states in the management table T, and sets the read permission flags F3 corresponding to the management file D3 in on states in the management table T.

As to the user file D5, when the power supply from the first device 2 to the controller 13 is started, for example, the controller 13 retrieves the nonvolatile memory 12 via the memory controller 15 and sets the read permission flags F3 corresponding to the user file D5 in off states in the management table T.

After the processes described above, the controller 13 returns an access permission (for example, ready response) to the first device 2 via the connector 16. Thus, when the memory system 1 is in the read lock mode, the first device 2 can read the directory entry file D2 and the management file D3 but cannot read the user file D5.

The controller 13 receives a write command including an address and a data size and the user file D4 from the first device 2 via the connector 16. The controller 13 writes the user file D4 in the nonvolatile memory 12 via the memory controller 15 based on the address and the data size of the write command and the user file D4, and registers the read permission flags F3 indicative on states corresponding to the user file D4 in the management table T based on the address and the data size. Thus, in the present embodiment, the read permission flags F3 related to data written in the nonvolatile memory 12 are set in the management table T based on the address and the data size of the write command received from the first device 2.

When the controller 13 of the present embodiment receives the read command from the first device 2 via the connector 16, the controller 13 retrieves the read permission flags F3 related to the address of the read command.

The controller 13 counts a number of the read permission flags F3 in the on states amongst the retrieved read permission flags F3 as a data transfer number. The controller 13 reads data corresponding to the read permission flags F3 for the data transfer number from the nonvolatile memory 12 via the memory controller 15 and transmits the read data to the first device 2 via the connector 16.

A size of the read permission flag F3 may be set, for example, based on a memory capacity of the nonvolatile memory 12 or standard adopted by the memory system 1 when the controller 13 receives a write command, or may be preliminarily set by a user or a manufacturer in the memory system 1.

Furthermore, in the present embodiment, the controller 13 repeats the retrieval of the read permission flag F3 while the data transfer number, in other words, the number of counted read permission flags in on states corresponding to the read command is less than a certain transfer limitation number.

The controller 13 reads, if the data transfer number becomes equal to or more than the transfer limitation number, data corresponding to the read permission flags F3 for the data transfer number, and transmits the read data to the first device 2 via the connector 16.

As described above, in the present embodiment, the read permission flags F3 and actual memory areas of the nonvolatile memory 12 are associated with each other in a one-on-one manner. The controller 13 divides an address of read target with a size of memory area allocated to one read permission flag F3, and thus, can easily acquire the read permission flags F3 corresponding to an area (position) indicated by the address of read target. A process to acquire the read permission flags F3 corresponding to the address of read target is referred to as retrieval of the read permission flags F3 of the present embodiment. The controller 13 can easily determine whether or not the retrieved read permission flag F3 is on. In the present embodiment, by simplifying the retrieval of the read permission flags F3, a time to read data from the nonvolatile memory 12 is shortened. In the present embodiment, one read permission flag F3 is allocated to a memory area having a greater size that the size of the read permission flag F3, and thus, the whole nonvolatile memory 12 can be managed by the management table T having a smaller size than that of the nonvolatile memory 12.

FIG. 3 is a flowchart showing an example of a data read process in the read lock mode of the present embodiment.

When the controller 13 receives a read command including an address from the first device 2 via the connector 16, the controller 13 retrieves read permission flags F3 corresponding to the address with respect to the management table T of the memory R in step S301, and acquires a data transfer number. The process of the retrieval of the management table T and acquisition of the data transfer number in step S301 will be explained later with reference to FIG. 4.

In step S302, the controller 13 determines whether or not the data transfer number is greater than zero.

If the data transfer number acquired in step S301 is zero, the retrieved read permission flags F3 are determined to be off, and the process moves to step S309.

In step S309, the controller 13 does not executes access to the nonvolatile memory 12 and prepares dummy data.

In step S310, the controller 13 returns the dummy data to the first device 2 via the connector 16.

In step S311, the controller 13 determines whether or not an end command is received from the first device 2 via the connector 16.

If the end command is not received, the process returns to step S309.

If the end command is received, the process ends.

If the data transfer number is one or more in step S302, the controller 13 determines that the retrieved read permission flags F3 are on. Then, in step S303, the controller 13 issues a read command to perform read of data corresponding to the read permission flags F3 for the data transfer number to the nonvolatile memory 12 via the memory controller 15.

In step S303, when the read command of data corresponding to the read permission flags F3 for the data transfer number is issued, the memory controller 15 transmits the data corresponding to the read permission flags F3 for the data transfer number to the controller 13 in step S304, and the controller 13 transfers the data corresponding to the read permission flags F3 for the data transfer number to the first device 2 via the connector 16.

In step S305, if the read of data instructed by the read command (that is, data corresponding to the read permission flags F3 for the data transfer number) ends, the memory controller 15 notifies a transfer end to the controller 13, and the controller 13 sets a transfer end flag in the memory R, for example, and ends the transfer.

The controller 13 performs the retrieval of the management table T and the acquisition of the data transfer number after a second round in step S306 while the memory controller 15 performs a read operation.

In step S306, when the retrieval of the management table T and the acquisition of the data transfer number end, the controller 13 determines whether or not an end command is received from the first device 2 in step S307. If the end command is received, the controller 13 ends the transfer.

If it is determined that the end command is not received in step S307, in step S308, the controller 13 refers to a transfer end flag of the memory R and determines whether or not the transfer of the memory controller 15 ends.

If the transfer end flag is set in the memory R in step S308, the process returns to step S302, and the controller 13 checks whether or not the data transfer number is one or more in step S306, and if the data transfer number is one or more, the process moves to step S303, and a read command corresponding to the read permission flags F3 for the data transfer number is issued. In step S302, if the data transfer number acquired in step S306 is determined to be zero, the process moves to step S309 and the controller 13 prepares dummy data.

If the transfer end flag is not set in the memory R in step S308, the process returns to step S307, and the same process is repeated until an end command is received or a transfer end flag is set.

Figure 4:
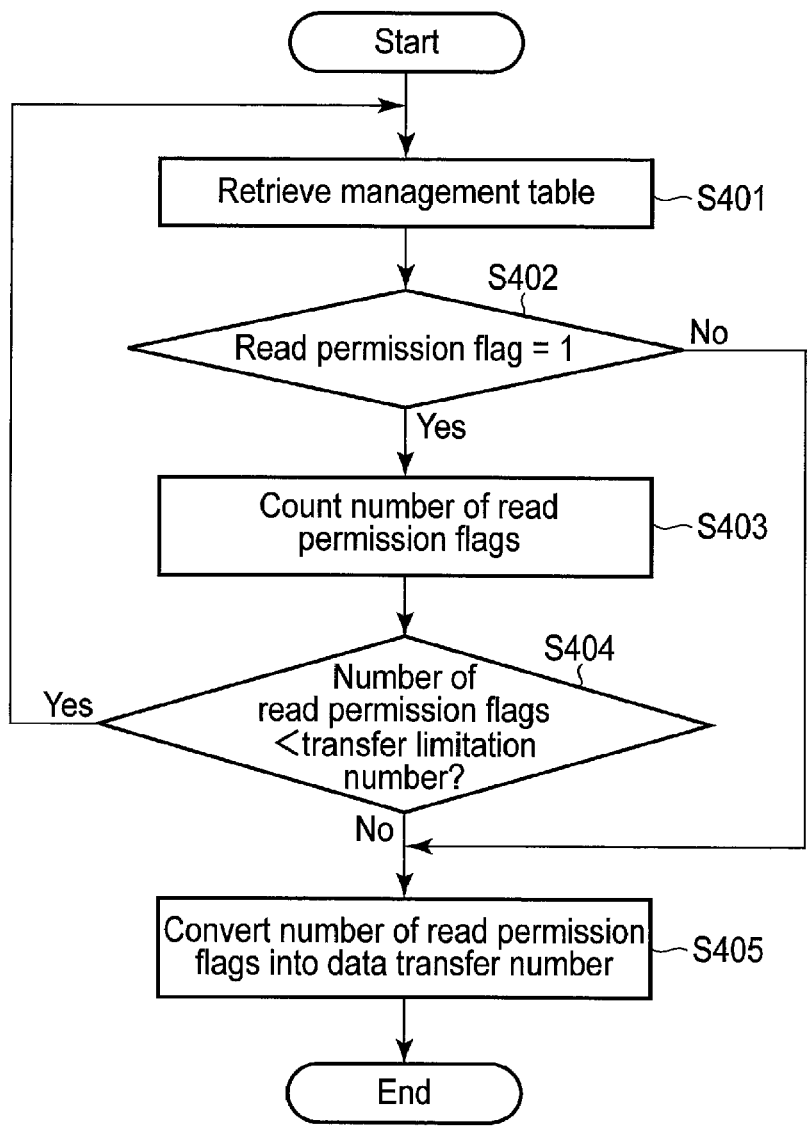
FIG. 4 is a flowchart of an example of a process of management table retrieval and data transfer number acquisition of the embodiment.

FIG. 4 is a flowchart of an example of a process of management table retrieval and data transfer number acquisition of the present embodiment. FIG. 4 corresponds, for example, steps S301 and S306 of FIG. 3.

In step S401, the controller 13 divides a size of an area indicated by a read address by a size of an area allocated to one read permission flag F3, and retrieves the read permission flags F3 matching with the read address from the management table T based on the quotient and remainder. With the above method, the read permission flags F3 can easily be retrieved from the management table T.

In step S402, the controller 13 determines if the retrieved read permission flag F3 is on (for example, "1") or off (for example, "0"), and determines whether or not read is permitted with respect to the data to be read by the first device 2. With the above method, whether or not read is permitted with respect to the data to be read by the first device 2 can easily be determined.

If the read permission flag F3 is determined to be on in step S402, the controller 13 counts the number of the read permission flags F3 determined to be on in step S404.

In step S404, for example, if the memory controller 15 has a transfer limitation number, the controller 13 compares the transfer limitation number with the counted number of the read permission flags. Note that, if the memory controller 15 does not have a transfer limitation number, step S404 may be omitted.

In step S404, if the number of read permission flags is less than the transfer limitation number of the memory controller 15, the process returns to step S401, and the controller 13 retrieves the read permission flag F3 from the management table T.

In step S404, if the number of read permission flags is equal to or more than the transfer limitation number of the memory controller 15, the process moves to step S405, and the controller 13 converts the number of read permission flags into the data transfer number and ends the process.

If the read permission flag F3 is determined to be off in step S402, the process moves to step S405, and the controller 13 converts the number of read permission flags into the data transfer number and ends the process.

Figure 5:
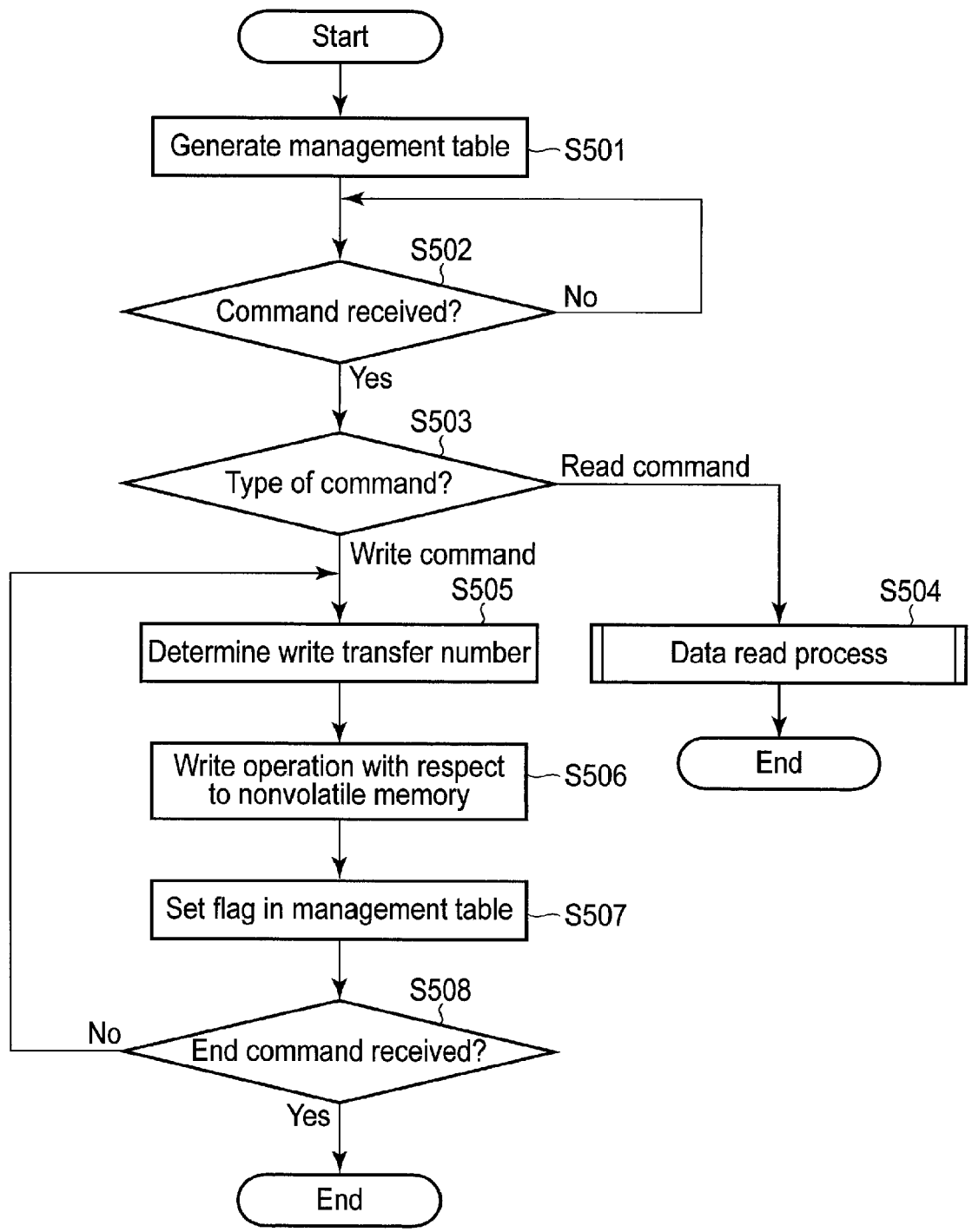
FIG. 5 is a flowchart of an example of a process in the read lock mode executed by the memory system of the embodiment.

FIG. 5 is a flowchart of an example of a process in the read lock mode executed by the memory system 1 of the present embodiment. FIG. 5 shows the process from generation of a management table T in the read lock mode to execution of a process corresponding to a received command.

In the read lock mode, when the controller 13 receives power from the first device 2, in step S501, the controller 13 reads the file allocation data D1 from the nonvolatile memory 12 via the memory controller 15 and generates the management table T indicative of whether or not read of data is permitted in the read lock mode based on the file allocation data D1. For example, the controller 13 registers the read permission flags F3 which permit read of the management file D3 read by the first device 2 in the management table T, and registers the read permission flags F3 which permit read of the directory entry file D2 indicative of a relationship between the read permission flags F3 and addresses in the management table T. The controller 13 registers the read permission flags F3 which deny read of the user data D5 in the management table T. The controller 13 stores the generated management table T in the memory R.

In step S502, the controller 13 determines whether or not a command is received from the first device 2 via the connector 16. If the command is not received, the process repeats step S502, and the command is waited for.

If the command is received, in step S503, the controller 13 determines the type of the received command.

If the received command is a read command, in step S504, the controller 13 executes a data read process and ends the process. In step S504, for example, the data read process explained with reference to FIG. 3 is executed.

If the received command is a write command, in step S505, the controller 13 determines a write transfer number which is obtained by dividing a size of write data with a size of an area corresponding to one read permission flag F3.

In step S506, the controller 13 transmits a write command of data corresponding to the read permission flags F3 for the write transfer number to the memory controller 15. The memory controller 15 writes the data corresponding to the read permission flags F3 for the write transfer number in the nonvolatile memory 12.

In step S507, if the write of data corresponding to the read permission flags F3 for the write transfer number, the controller 13 sets the read permission flags F3 for the write transfer number in the management table T. Thus, based on the address and the data size of the write command, at every time when the write of data ends, the read permission flags F3 corresponding to the data can be set in the management table T and the management table T can be rapidly updated.

In step S508, the controller 13 determines whether or not an end command is received from the first device 2 via the connector 16. If the end command is not received, the process returns to step S505. If the end command is received, the process ends.

FIG. 6 is a flowchart of an example of a setting process of read permission flags F3 of the memory system 1 of the present embodiment.

FIG. 6 shows an example where the read permission flags F3 corresponding to the user file D5 stored in the nonvolatile memory 12 before the power supply from the first device 2 to the controller 13 is stopped are set to off after the start of the power supply. However, for example, the read permission flags F3 corresponding to the user file D5 written may be switched from on to off when the power supply is stopped, and the read permission flags F3 corresponding to the user file D5 in off states may be secured in the nonvolatile memory R or the nonvolatile memory 12.

In step S601, the controller 13 receives the power supply from the first device 2. In the power supply state, the following steps S602 to S603 are performed.

In step S602, the controller 13 reads the file allocation data D1 from the nonvolatile memory 12 via the memory controller 15, and sets the read permission flags F3 corresponding to the directory entry file D2 and the management file D3 to on in the management table T. Furthermore, the controller 13 sets the read permission flags F3 corresponding to the user file D5 already written in the nonvolatile memory 12 before the start of the power supply to off in the management table T.

In step S603, the controller 13 sets the read permission flags F3 corresponding to the user file D4 written in the nonvolatile memory 12 while the power supply is continued to on.

In step S604, the controller 13 repeats step S603 while the power is supplied. Note that the controller 13 may return from step S604 to step S602 while the power is supplied.

In step S604, if the power supply from the first device 2 to the controller 13 is stopped, the management table T stored in the memory R of the controller 13 is erased from the hardware, and the process ends. The erase of the management table T may be performed by the controller 13 when the power supply is stopped, or by realizing the memory R as a volatile memory such that the data of the memory R are lost when the power supply is stopped.

In the above-described embodiment, the read lock mode is adopted, and thus, the first device 2 can read data written in the memory system 1 while the power is supplied to the memory system 1 but cannot read data already written in the memory system 1 before the power supply is started.

Thus, security of the data stored in the memory system 1 can be secured.

In the present embodiment, read of a range of addresses in which the file allocation data D1 of the nonvolatile memory 12 are stored is permitted comprehensively regardless of the read permission flags F3. When the power supply from the first device 2 to the memory system 1 is started, the controller 13 reads the file allocation data D1, sets the read permission flags F3 corresponding to the directory entry file D2 and the management file D3 of the nonvolatile memory 12 to on, sets the read permission flags F3 corresponding to the user file D5 already written before the power supply to off, and generates the management table T. Then, the controller 13 returns a ready response to the first device 2 via the connector 16.

In the present embodiment, the read permission flags F3 corresponding to the file allocation data D1 is not required to be set in the management table T. The controller 13 compares an address of a read command with an address indicative of a position of the first allocation data D1 used by the first device 2 (for example, boundary address), and the read may be comprehensively permitted with respect to the file allocation data D1. Thus, whether or not read is permitted with respect to the read command of the file allocation data D1 can be rapidly determined, and the file allocation data D1 can be rapidly read.

In the present embodiment, between the start of the power supply from the first device 2 to the memory system 1 and the return of the ready response from the memory system 1 to the first device 2, the controller 13 can prepare the management table T. The controller 13 can set the read permission flags F3 of the management file D3 read from the first device 2 to on states, and the management file D3 can be properly read.

In the present embodiment, the controller 13 acquires, when the write command is received from the first device 2 via the connector 16, the write transfer number. Then, the controller 13 performs write to the nonvolatile memory 12 via the memory controller 15, and then, updates the read permission flags F3 of the management table T based on the address and the data size of the write command. In the present embodiment, the management table T is updated at the same time with the end of write operation, and thus, read of the write data is secured since the write data are written in the nonvolatile memory 12 and while the power supply is received from the first device 2.

In the present embodiment, upon receipt of read command, the controller 13 initially retrieves the read permission flags F3 from the management table T. If the retrieved read permission flags F3 are on, the controller 13 executes read of data corresponding to the read permission flags F3 for the data transfer number based on the number of the read permission flags F3 in the on states with respect to the nonvolatile memory 12 via the memory controller 15, receives the data corresponding to the read permission flags F3 for the data transfer number from the memory controller 15, and immediately returns the received data to the first device 2 via the connector 16. If the memory controller 15 has a transfer limitation number, the controller 13 re-retrieves the management table T in parallel along with the data transfer based on the read operation. The controller 13 determines whether or not the data transfer number is less than the transfer limitation number in the retrieval and re-retrieval of the read permission flags F3. The controller 13 performs the retrieval of management table T if the data transfer number is less than the transfer limitation number. The controller 13 determines, if the data transfer number is equal to or more than the transfer limitation number, whether or not the end command is received from the first device 2 via the connector 16, and if the end command is not received, performs read with respect to the nonvolatile memory 12. In the memory system 1 operating as above, at every time when the data transfer number becomes equal to or more than the transfer limitation number, read is performed with respect to the data permitted to be read and the read data are sequentially returned to the first device 2. The re-retrieval of management table T is performed in parallel along with the process to return the read data from the controller 13 to the first device 2, and thus, a time required to wait for transfer of read data in the memory system 1 can be shortened, and thus, the response of the memory system 1 can be performed faster. Furthermore, since a time to secure data in the memory R can be shortened, the memory capacity of the memory R can be decreased.

If there is no transfer limitation in the memory controller 15, the retrieval is continued until an off is found in the management table T, and thus, the retrieval of the management table T is performed once.

In the present embodiment, when power is supplied from the first device 2 to the memory system 1, the read lock flag F1 stored in the wireless communication memory 17 is stored in the memory R. The read lock flag F1 stored in the wireless communication memory 17 can be updated using wireless communication between the second device 3 and the memory system 1 even if the power is not supplied from the first device 2 to the memory system 1. Thus, a user can update the read lock flag F1 even if the power is not supplied from the first device 2 to the memory system 1, and user convenience can be improved.

Note that the read lock flag F1 may not be stored in a wireless communication memory 37 but may be stored in the memory R of the controller 13. In that case, update of the read lock flag F1 is performable only when the power is supplied from the first device 2 to the memory system 1, and thus, a change of the read lock flag F1 in a state where the memory system 1 is not attached to the first device 2 can be prevented. Thus, security of the memory system 1 can be secured.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory; and
a controller configured to control access to the nonvolatile memory, wherein,
when power supply is started with respect to the controller, the controller reads file allocation data indicative of an allocation position of a file stored in the nonvolatile memory from the nonvolatile memory, generates information indicating that the controller is permitted to read a system file stored in the nonvolatile memory, and generates information indicating that the controller is not permitted to read a first user file already written in the nonvolatile memory before the power supply,
the controller generates information indicating that the controller is permitted to read a second user file written in the nonvolatile memory after the start of the power supply,
the controller manages management data including read permission information indicative of whether or not read is permitted per data of certain size in the nonvolatile memory, and
the controller receives a read command from an external device, acquires the read permission information corresponding to an area indicated by an address of a read target, counts a data transfer number which is a number of information indicative of read permission amongst the acquired read permission information and transfers data which is read from the nonvolatile memory and which corresponds to the read permission information for the data transfer number to the external device.

2. The memory system of claim 1, wherein the controller determines that the data is permitted to be read from the nonvolatile memory if a flag which prohibits read of a file already written in the nonvolatile memory before the power supply to the controller is off, and determines whether or not the data is permitted to be read based on the management data if the flag is on.

3. The memory system of claim 1, wherein the controller further generates information indicating that the controller is permitted to read an entry file stored in the nonvolatile memory when the power supply to the controller is started,
the information indicating that the entry file is permitted to be read is managed by the management data, and
the entry file associates a physical address of the nonvolatile memory with an entry of the management data.

4. The memory system of claim 1, wherein the controller sets, if a write command is received, the read permission information corresponding to the second user file based on an address and a data size included in the write command.

5. The memory system of claim 1, wherein the controller performs acquiring the read permission information if the counted data transfer number is less than a predetermined transfer limitation number, and transferring the data corresponding to the read permission information corresponding to the data transfer number read from the nonvolatile memory to the external device if the data transfer number is equal to or more than the predetermined transfer limitation number.

6. The memory system of claim 5, wherein the controller performs a read process of the data corresponding to the read permission information for the data transfer number, and at least one of an acquisition process of next read permission information or a count process of a next data transfer number in parallel.

7. The memory system of claim 1, further comprising:
a connector which is electrically connectable to a first external device;
a wireless antenna;
a memory operable based on power supplied from the wireless antenna; and
a communication controller which is operable based on power supplied from the wireless antenna and performs communication with a second external device using the wireless antenna, wherein
the nonvolatile memory and the controller are operated based on power supplied from the first external device via the connector.

8. The memory system of claim 7, wherein the communication between the communication controller and the second external device is wireless communication conforming to Near Field Communication (NFC).

9. The memory system of claim 7, wherein the controller includes a memory controller configured to perform read of read target data from and write of write target data to the nonvolatile memory, and a bridge controller configured to perform data transfer/reception between the memory controller and the communication controller.

10. The memory system of claim 1, wherein the controller performs determination of readability with respect to an address corresponding to a storage area of the file allocation data in the nonvolatile memory.

11. The memory system of claim 1, wherein the controller returns, if a read command is received from an external device but read target data is not permitted to be read from the nonvolatile memory, dummy data to the external device.

12. A control method of a memory system including a nonvolatile memory and a controller configured to control the nonvolatile memory, the method comprising:
when power supply is started with respect to the controller, reading file allocation data indicative of an allocation position of a file stored in the nonvolatile memory from the nonvolatile memory, generating information indicating that the controller is permitted to read a system file stored in the nonvolatile memory, and generating information indicating that the controller is not permitted to read a first user file already written in the nonvolatile memory before the power supply, by the controller; and
generating, by the controller, information indicating that the controller is permitted to read a second user file written in the nonvolatile memory after the start of the power supply, the method further comprising managing, by the controller, management data including read permission information indicative of whether or not read is permitted per data of certain size in the nonvolatile memory, and the method further comprising:

receiving a read command from an external device, acquiring the read permission information corresponding to an area indicated by an address of a read target, counting a data transfer number which is a number of information indicative of read permission amongst the acquired read permission information, and reading data corresponding to the read permission information for the data transfer number from the nonvolatile memory, by the controller; and transferring the data corresponding to the permission data for the read data transfer number to the external device, by the controller.

13. The method of claim 12, further comprising setting, if a write command is received, the read permission information corresponding to the second user file in the management data based on an address and a data size included in the write command, by the controller.

\* \* \* \* \*